United States Patent [19]

Suzuki et al.

[11] Patent Number: 4,458,646
[45] Date of Patent: Jul. 10, 1984

[54] SPARK TIMING CONTROL SYSTEM FOR AN INTERNAL COMBUSTION ENGINE

[75] Inventors: Mikio Suzuki, Zushi; Masafumi Yamasaki, Yokohama, both of Japan

[73] Assignee: Nissan Motor Company, Limited, Yokohama, Japan

[21] Appl. No.: 324,110

[22] Filed: Nov. 23, 1981

[30] Foreign Application Priority Data

Nov. 26, 1980 [JP] Japan ............................ 55-169133[U]

[51] Int. Cl.³ .............................................. F02P 5/14
[52] U.S. Cl. .................................. 123/425; 123/422; 123/421; 123/424
[58] Field of Search ............... 123/421, 422, 424, 425, 123/492

[56] References Cited

U.S. PATENT DOCUMENTS

| | | | |
|---|---|---|---|
| 3,491,735 | 1/1970 | Walker | 123/424 |
| 3,855,975 | 12/1974 | Masaki et al. | 123/421 |
| 3,913,539 | 10/1975 | Winkley | 123/424 |
| 3,935,845 | 2/1976 | Aono et al. | 123/422 |
| 4,147,143 | 4/1979 | Harada | 123/422 |
| 4,157,699 | 6/1979 | Mori | 123/494 |
| 4,232,642 | 11/1980 | Yamaguchi et al. | 123/422 |
| 4,236,491 | 12/1980 | Hattori et al. | 123/425 |
| 4,274,378 | 6/1981 | Tate | 123/421 |
| 4,282,841 | 9/1981 | Takagi et al. | |
| 4,370,964 | 2/1983 | Muranaka et al. | 123/425 |

FOREIGN PATENT DOCUMENTS

| | | |
|---|---|---|
| 2925770 | 1/1980 | Fed. Rep. of Germany . |
| 2932386 | 2/1980 | Fed. Rep. of Germany . |
| 2055964 | 3/1981 | United Kingdom ............... 123/422 |

Primary Examiner—Parshotam S. Lall
Attorney, Agent, or Firm—Schwartz, Jeffery, Schwaab, Mack, Blumenthal & Koch

[57] ABSTRACT

A spark timing control system for an internal combustion engine features an ignition device, a power increase detector, a control device, and a temperature detector. The ignition device produces a spark in a combustion chamber of the engine. The power increase detector senses an increase in the output power required of the engine. The control device is connected to the ignition device for controlling timing of the spark, and is also connected to the power increase detector for retarding the spark timing in terms of engine crank angle when the engine is required to increase its output power. The temperature detector senses the temperature of engine coolant and suspends the retardation of the spark timing due to the engine power increase in response to the temperature of engine coolant.

8 Claims, 17 Drawing Figures

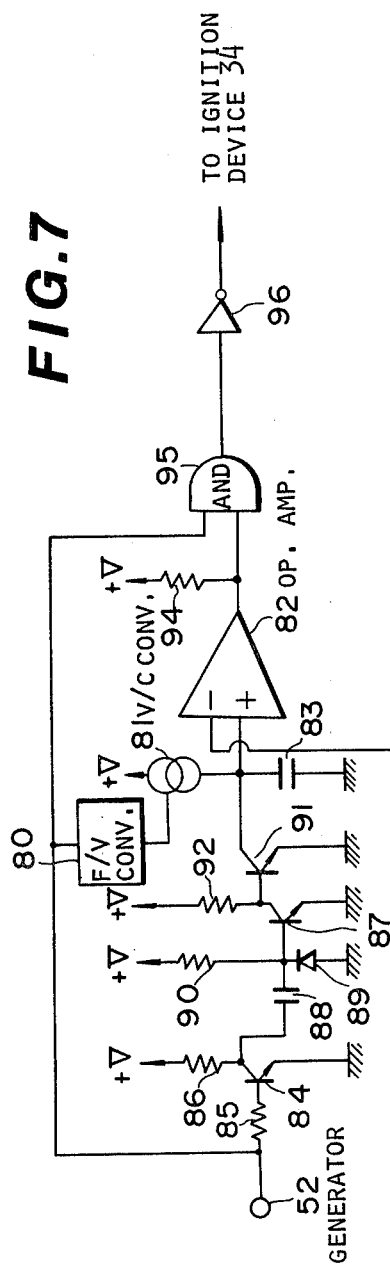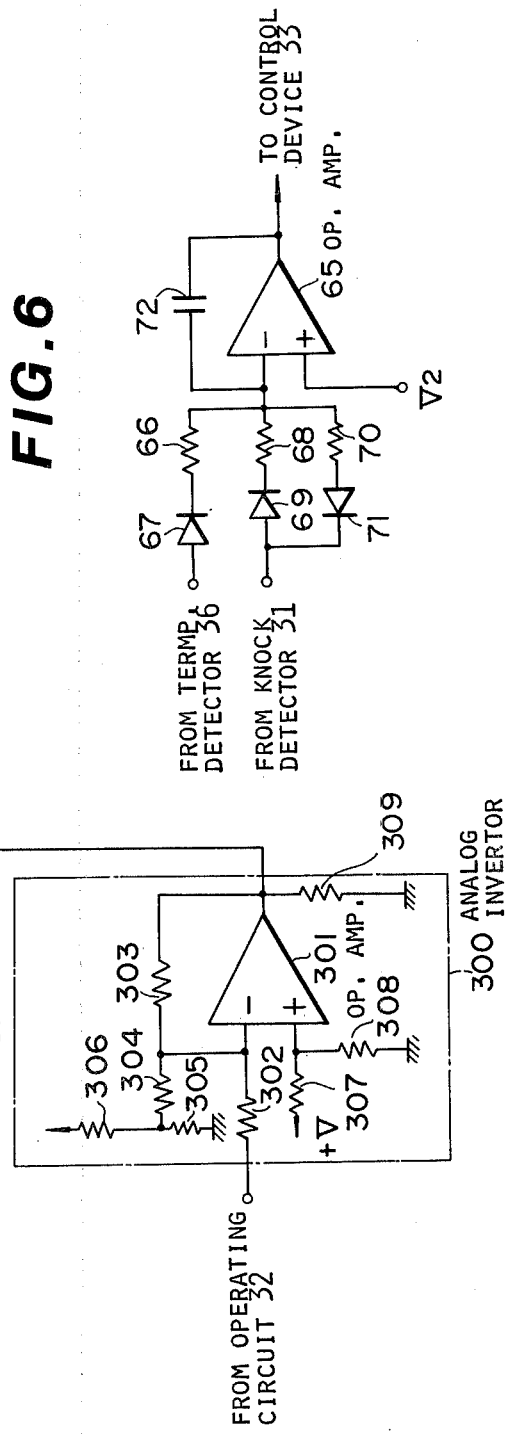

POWER INCREASE DETECTOR

SPARK TIMING CONTROL SYSTEM FOR AN INTERNAL COMBUSTION ENGINE

BACKGROUND OF THE INVENTION

1. Field of the Invention

This invention relates to a spark timing control system for a spark ignition internal combustion engine, and more particularly to a spark timing control system equipped with a sensor for detecting an increase in the output power required of the engine to retard spark from the normal setting to obtain an optimal operation of the engine when an increase in the output power is required of the engine, for example, in the case of quick acceleration.

2. Description of the Prior Art

It is known to combine a knock detector with a spark timing control system for a spark ignition internal combustion engine, in order to achieve an optimal operation of the engine from the standpoint of fuel economy and knock prevention. This conventional system retards spark when knocking occurs in the engine. On the other hand, the system usually advances spark timing as long as knock is absent in the engine. Since most engines tend to experience an increased knocking level as spark timing is advanced, the system constitutes a closed-loop control of spark timing and usually controls spark timing so as to operate the engine just under the knock limit or under trace (extremely-weak) knock conditions. In general, engine operation just under the knock limit or under trace knock conditions approximately coincides with the optimal operation of the engine from the standpoint of fuel economy and knock damage to the engine.

However, such a closed-loop spark timing control system falls into difficulty in controlling spark timing properly during engine transitional conditions, such as quick acceleration, where an increase in the output power is required of the engine, because the closed-loop control involves a relatively large time-constant or response time which prevents rapid change of spark timing in response to engine knock.

SUMMARY OF THE INVENTION

It is an object of the present invention to provide a spark timing control system for a spark ignition internal combustion engine, which can control spark timing properly even under engine transitional conditions, such as acceleration, in all ranges of engine coolant temperature.

According to the present invention, a spark timing control system for an internal combustion engine features an ignition device, a power increase detector, a control device, and a temperature detector. The ignition device produces a spark in a combustion chamber of the engine. The power increase detector senses an increase in the output power required of the engine. The control device is connected to the ignition device for controlling the timing of the spark, and is also connected to the power increase detector for retarding the spark timing in terms of engine crank angle when an increase in the output power is required of the engine. The temperature detector senses the temperature of engine coolant and suspends the retardation of the spark timing due to the engine power increase in response to the temperature of engine coolant.

The above and other objects, features and advantages of the present invention will be apparent from the following description of preferred and alternative embodiments thereof, taken in conjunction with the drawings.

BRIEF DESCRIPTION OF THE DRAWINGS

FIG. 6 is a schematic diagram of the operating circuit of FIG. 1;

FIG. 7 is a schematic diagram of the spark timing control device of FIG. 1;

DESCRIPTION OF THE PREFERRED EMBODIMENTS

Figure 1:
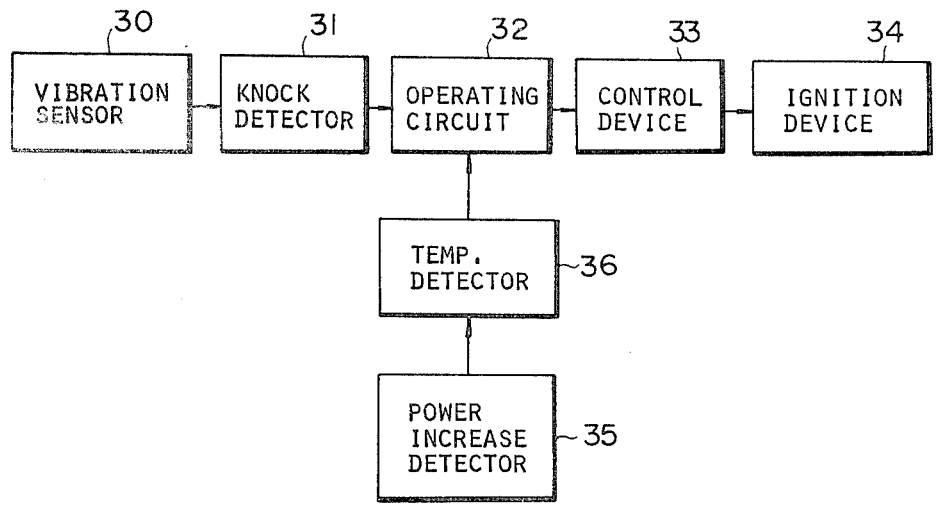
FIG. 1 is a block diagram of a spark timing control system for an internal combustion engine, according to the present invention.

With reference to FIG. 1, there is shown a spark timing control system for a spark ignition internal combustion engine according to the present invention, which includes a vibration sensor 30 serving as a knock sensor, a knock detector 31, an operating circuit 32, a spark timing control device 33, an ignition device 34, a power increase detector 35, and an engine coolant temperature detector 36.

The vibration sensor 30 is fixed to the engine at, for example, the intake manifold (not shown) or the engine body (not shown) for detecting a vibration thereof. It is known that each time a knock occurs in the engine, the vibration of engine body increases abruptly and especially a particular frequency component of vibration remarkably increases in amplitude. The vibration sensor 30 transforms the vibration of the engine body into the corresponding alternating voltage signal. The vibration sensor 30 may be a resonance-type vibration sensor which has a resonance frequency substantially identical with the above-mentioned particular frequency of engine body vibration. The vibration sensor 30 may be substituted by a pressure sensor for detecting pressure in the engine combustion chamber (not shown). The vibration sensor 30 may be substituted by a sound sensor for detecting sound caused by the engine body vibration.

Figure 2:
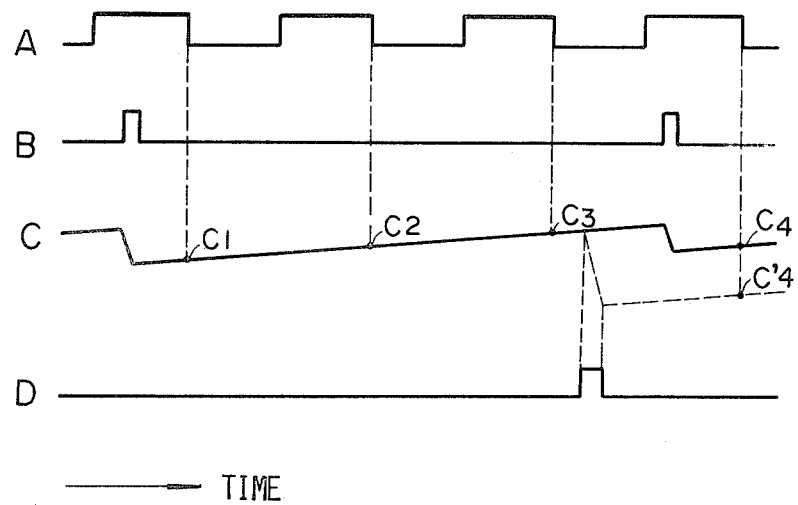
FIG. 2 is a timing chart showing waveforms obtained at various points in the block diagram of FIG. 1.

The knock detector 31 is coupled to the vibration sensor 30 for receiving the output alternating voltage signal thereof containing knock information, and discriminates the occurrence of a significant knock, based predominantly on the amplitude level of the output signal of the sensor 30. More particularly, the component of the output signal of the sensor 30 which has the above-mentioned particular frequency is selected by the detector 31 and the amplitude level of such a component is used to discriminate the occurrence of a significant knock. However, this selection is unnecessary when the resonance-type vibration sensor is used. As the knock is detected, the detector 31 generates a knock signal or pulse having a predetermined width, as shown in FIG. 2 at B.

The operating circuit 32 is essentially composed of a charging-discharging circuit, or integrating circuit which is connected to the knock detector 31 for receiving the output thereof. As shown in FIG. 2 at C, except during an engine power increase condition, when the pulse B representative of the occurrence of a knock is applied to the operating circuit 32, this circuit generates a voltage signal whose level decreases at a first predetermined rate, and as long as a pulse B is not applied to the circuit 32, the level of the voltage signal increases at a more gradual, second predetermined rate. The first predetermined rate is generally set greater than the second predetermined rate.

The spark timing control device 33 is coupled to the operating circuit 32 for receiving the voltage output thereof. The spark timing control device 33 produces, in response to the output voltage signal of the operating circuit 32, a pulse signal which determines the spark timing.

The ignition device 34 is coupled to the spark timing control device 33 for receiving the spark timing control pulse therefrom. The ignition device 34 causes a spark across a spark plug (not shown) in the engine combustion chamber in response to the spark timing control pulse from the control device 33.

The spark timing control device 33 advances or retards the spark timing by means of the ignition device 34, approximately in proportion to the output voltage level (e.g. $C_1$, $C_2$, $C_3$, $C_4$ as shown in FIG. 2) of the operating circuit 32 at the falling edge of each pulse A (shown in FIG. 2 at A) which is the inverse of a spark timing control reference pulses produced at predetermined angular positions of the engine crankshaft or camshaft. If, for example, the output waveform of the operating circuit 32 is as shown by the solid line C in FIG. 2, the voltage drop due to the occurrence of a knock results in the decreased output voltage level $C_1$ immediately after the occurrence of the knock. Consequently, the first spark immediately after the occurrence of the knock is effected at a relatively retarded angle with respect to the spark before the knock occurs. Until a subsequent knock occurs, the output voltage increases at the second predetermined rate and the level of the output voltage progresses such that $C_1 < C_2 < C_3$.

Accordingly, with reference to the above-mentioned first spark immediately after the occurrence of the knock corresponding to the output level $C_1$, the subsequent spark corresponding to the level $C_2$ is effected with a relatively advanced angle, and the next spark corresponding to the level $C_3$ is effected with a further advanced angle. In this way, the spark timing is advanced in terms of engine crank angle as long as knock does not occur. However, as advance angle of the spark timing continues to increase, knocking necessarily will occur in the engine and this knocking decrease the output voltage level as shown at $C_4$ ($C_4 < C_3$). Accordingly, the subsequent spark is effected at a relatively retarded angle as compared to the spark before the occurrence of the subsequent knock. By repeating this operation, the spark timing is maintained near the limit of occurrence of the knock, to thereby hold the engine under a trace knocking state so that the fuel consumption, namely the output power efficiency characteristics of the engine, and the limitation of knock damage to the engine can be optimized. Generally, the output voltage of the operating circuit 32 can vary within a range whose upper and lower limits determine the maximum and minimum advance angles of the spark timing respectively.

The power increase detector 35 senses an increase in the output power demand on the engine or in the load on the engine and generates a power increase pulse signal during the engine power or load increase condition, such as an increase in the engine speed (RPM). The power increase detector 35 is connected to the operating circuit 32 through the engine coolant temperature detector 36 for sending the power increase pulse signal to the operating circuit 32 provided that the engine coolant temperature is above a preset value. The power increase pulse forcedly reduces the output voltage level of the operating circuit 32 so that the spark timing will be retarded as quickly as required during the engine power increase condition independent of the occurrence of the knock. The width of the power increase pulse generally increases with the degree of the engine power increase.

When the power increase detector 35 generates a pulse (shown in FIG. 2 at D) in response to an increase in the output power required of the engine under conditions in which the engine coolant temperature is above the preset value, the output voltage of the operating circuit 32 decreases at a third predetermined rate during the interval of the pulse width of the pulse D, as shown by the broken line in FIG. 2 at C. The third predetermined rate is generally set greater than the hereinbefore described second predetermined rate of the variation in the output voltage of the operating circuit 32 so that the output voltage level at the time point $C_4$ decreases to the level $C'_4$, as shown in FIG. 2. The first spark after detecting the engine power increase is based on the voltage level $C'_4$, and is effected with a relatively retarded angle corresponding to the above-mentioned voltage drop, as compared to the spark before the the detection of the engine power increase. In this way, the spark timing is forcedly retarded when an increase in the output power is required of the engine and the engine coolant has a temperature above the preset value, regardless of the presence of the knock pulse by which a normal closed-loop spark timing control is effected. The decrease in the voltage level of the operating circuit 32 depends on the width of the power increase pulse and hence on the degree of the engine power increase. Consequently, the spark timing is more retarded as a more suddenly increase in the output power is required of the engine provided that the engine coolant temperature is above the present value.

The engine coolant temperature detector 36 includes a switch which is disposed in the connection of the power increase detector 35 to the operating circuit 32. When the engine coolant temperature is above the preset value, the switch of the detector 36 closes to allow the power increase pulse to travel from the detector 35 to the operating circuit 32. In this case, the control device 33 thus controls the spark timing in response to both the knock pulse from the detector 31 and the power increase pulse from the detector 35, as described hereinbefore. When the engine coolant temperature is equal to or below the preset value, the switch of the detector 36 opens to cut-off the supply of the power increase pulse from the detector 35 to the operating circuit 32. In this case, the device 33 thus controls the spark timing in response to only the knock pulse from the detector 31, suspending the forced retardation of spark timing during engine power increase.

Generally, the spark ignition internal combustion engine tends to knock during high output power or heavy load conditions especially when the engine coolant temperature is relatively high. Since the control device 33 quickly and forceably retards the spark timing even under rapid power increase conditions which cause the engine to enter the high output power condition, knocking is prevented in the engine even though the closed-loop spark timing control could not prevent the occurrence of knock due to the relatively long response time of the closed-loop control. Therefore, knocking damage to the engine can be prevented even under rapid power increase conditions of the engine. Additionally, the spark ignition internal combustion engine has substantially no possibility of knocking even under rapid power increase conditions when the engine coolant temperature is relatively low. Since the temperature detector 36 suspends the forced retardation of spark timing and maintains the normal closed-loop control of spark timing under this engine power increase condition, the impairment of air-fuel mixture combustion due to the forced retardation of spark timing can be prevented while still preventing knocking. This suspending action by the temperature detector 36 thus provides improved fuel consumption, or power output, and power increase characteristics of the engine.

KNOCK DETECTOR

Figure 3:
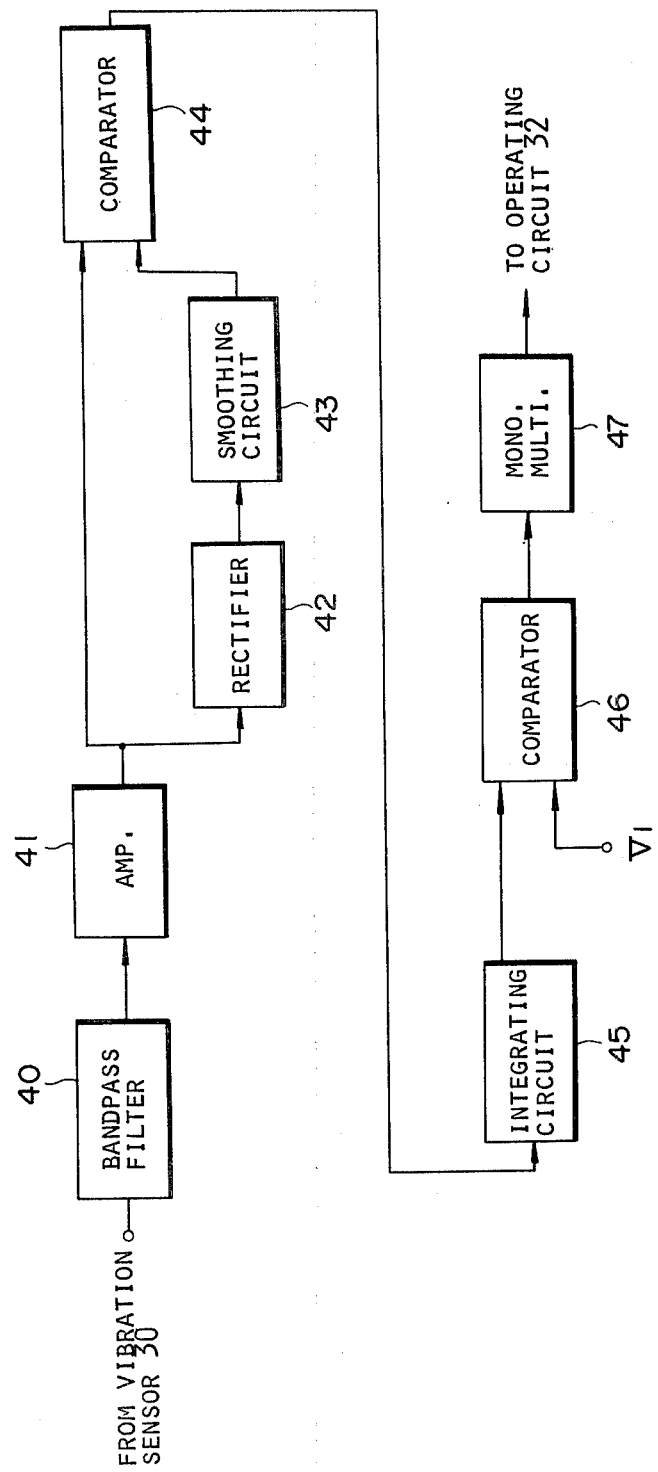
FIG. 3 is a block diagram of the knock detector of FIG. 1.

The details of the knock detector 31 are shown in FIG. 3, which includes a bandpass filter 40, an amplifier 41, a rectifier circuit 42, a smoothing circuit 43, a first comparator 44, an integrating circuit 45, a second comparator 46, and a monostable multivibrator 47. The input terminal of bandpass filter 40 is coupled to the output terminal of vibration sensor 30 (see FIG. 1) for receiving the alternating vibration sensor output containing knock information. The bandpass filter 40 is tuned to the previously-mentioned particular frequency associated with a knock to remove other frequency components from the alternating vibration sensor output. The input terminal of amplifier 41 is coupled to the output terminal of bandpass filter 40 for receiving the filtered signal from the bandpass filter 40. The amplifier 41 magnifies the filtered signal and outputs a signal with a waveform similar to that shown by the waveform F of FIG. 4. The lower part of the waveform F is omitted for simplicity of illustration.

The input terminal of rectifier circuit 42 is connected to the output terminal of amplifier 41 for receiving and rectifying the amplified alternating voltage signal F. The input terminal of smoothing circuit 43 is coupled to the output terminal of rectifier circuit 42 for receiving and smoothing the rectified signal from the rectifier circuit 42 to provide a background noise level reference. The smoothing circuit 43 contains an amplifier to provide an amplified background noise level reference as shown by the waveform E of FIG. 4.

One input terminal of first comparator 44 is connected to the output terminal of amplifier 41 for receiving the alternating voltage signal F, the other input terminal thereof being connected to the output terminal of smoothing circuit 43 for receiving the background noise level reference E. The first comparator 44 compares the alternating voltage signal F with the background noise level reference E and produces an inverse pulse when the signal F exceeds the reference E as shown in FIG. 4 at G.

The input terminal of integrating circuit 45 is coupled to the output terminal of first comparator 44 for receiving and integrating the pulse signal G from the first comparator 44. The integrating circuit 45 produces a voltage signal which rises at a predetermined rate during the pulse width of the inverse pulse from the first comparator 44, as shown by the waveform K of FIG. 4.

Figure 4:
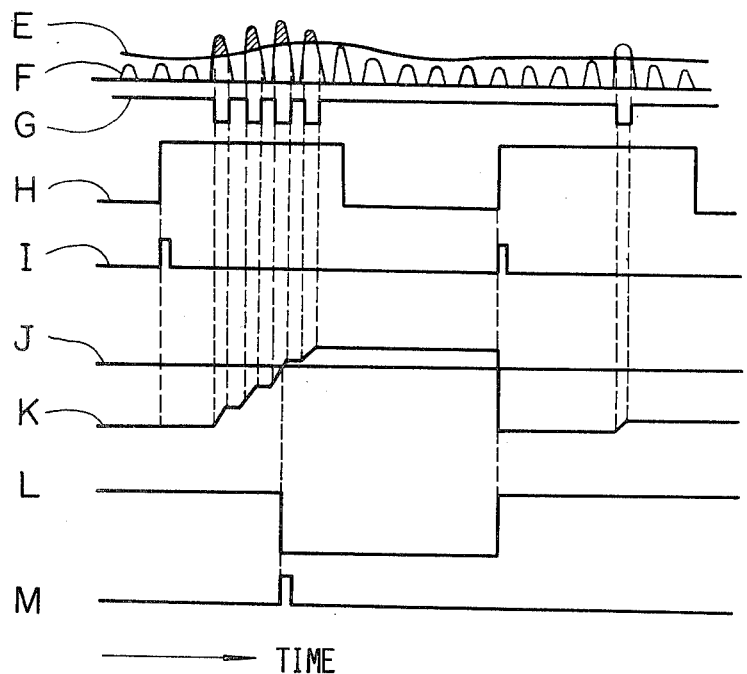
FIG. 4 is a timing chart showing waveforms obtained at various points in the block diagram of FIG. 3.
Figure 5:
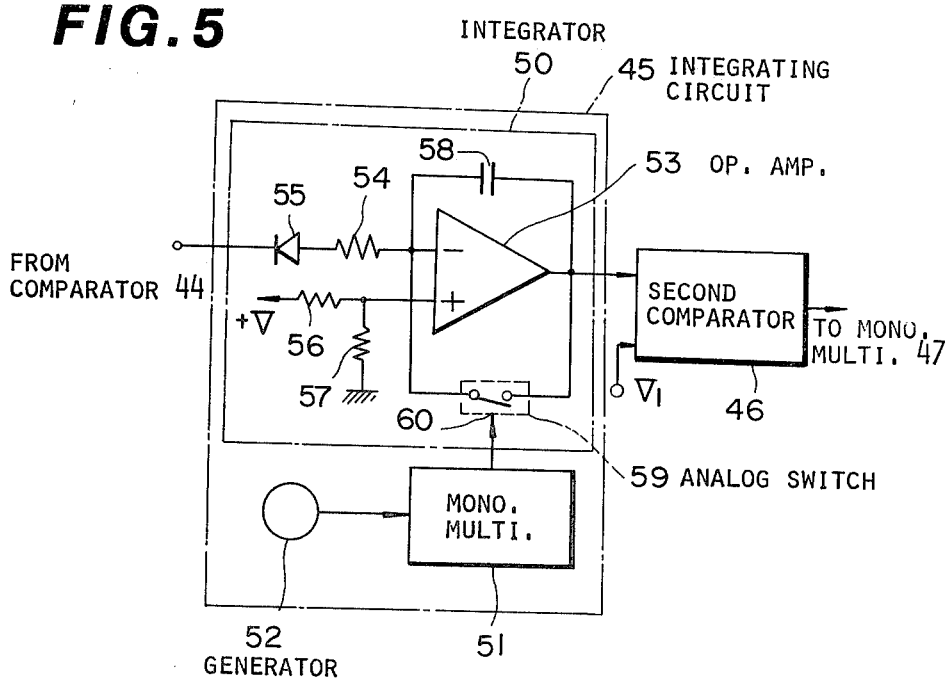
FIG. 5 is a schematic diagram of the integrating circuit of FIG. 3.

The details of the integrating circuit 45 are illustrated in FIG. 5, which has a integrator 50, a monostable multivibrator 51, and a generator 52. The integrator 50 contains an operational amplifier 53 whose negative input terminal is connected to the output terminal of first comparator 44 (see FIG. 3) through a resistor 54 and a diode 55 serially. The anode of diode 55 is connected to the amplifier 53 side and the cathode thereof is connected to the comparator 44 side. The positive input terminal of operational amplifier 53 is connected to the positive terminal of a stabilized DC power source (not shown) through a resistor 56 and is grounded through a resistor 57 in order to be supplied with a preset voltage. The output terminal of operational amplifier 53 is connected to the negative input terminal thereof through a capacitor 58. The rise rate of integrating circuit 45 output is determined by the capacitor 58 and the resistor 54. An analog switch 59 is connected across the capacitor 58 for selectively discharging the capacitor 58, thereby resetting the output of integrating circuit 45. The analog switch 59 has a control terminal 60 for control of the closing and opening thereof. The generator 52 produces a pulse at a preset angular position of the engine crankshaft or camshaft as a spark timing control reference signal which takes the form of a rectangular pulse train as shown by the waveform H of FIG. 4. The reference signal H is roughly synchronous with the spark timing. For example, the generator 52 may consist of a magnetic pickup device cooperating with the engine crankshaft or camshaft, and a waveform-shaping circuit which transforms the output of magnetic pickup device into the corresponding rectangular pulse train H. The magnetic pickup device of the generator 52 may therefore comprise a crank angle sensor. Since the magnetic pickup produces an alternating voltage whose frequency is proportional to the engine speed (RPM), the rectangular pulse train H outputted by the generator 52 also has a frequency proportional to the engine speed (RPM). The input terminal of monostable multivibrator 51 is connected to the output terminal of generator 52 for receiving the spark timing control reference signal H. The monostable multivibrator 51 produces an extremely-short-pulse width pulse in synchronism with the spark timing control reference signal H at the positive-going edge of a reference pulse H, as shown in FIG. 4 at I. The control terminal 60 of analog switch 59 is coupled to the output terminal of monostable multivibrator 51 for receiving the extremely-short-pulse width pulses I. Each time a pulse I is received by the control terminal 60, the analog switch 59 closes to short-circuit or discharge the capacitor 58, so that the output of integrating circuit 45 is reset to a predetermined basic level in synchronism with the pulse train I and thus the spark control reference signal H, as shown in the waveform K of FIG. 4.

One input terminal of second comparator 46 is connected to the output terminal of integrating circuit 45 in order to receive the integrated signal K, the other input terminal thereof being supplied with a preset voltage $V_1$ as shown by the waveform J of FIG. 4. The second comparator 46 compares the integrated signal K with the preset voltage $V_1$ (shown by the waveform J) and produces a low-voltage signal whenever the signal K exceeds the voltage $V_1$, as shown by the waveform L of FIG. 4. The low-voltage signal L outputted by the second comparator 46 indicates, in turn, a large and rapid increase in the amplitude of the vibration sensor 30 output due to the occurrence of knock in the engine.

As illustrated in FIG. 3, the input terminal of monostable multivibrator 47 is coupled to the output terminal of second comparator 46 in order to receive the low-voltage signal L, and produces at its $\overline{Q}$ output terminal a predetermined-width pulse which is synchronous with the falling edge of the low-voltage signal L, as shown in FIG. 4 at M. The pulse M indicates the occurrence of knock in the engine and is transmitted to the operating circuit 32 as a knock-indicating pulse.

OPERATING CIRCUIT

The details of the operating circuit 32 are illustrated in FIG. 6, which circuit 32 has an operational amplifier 65 whose negative input terminal is connected to the output terminal of engine coolant temperature detector 36 (see FIG. 1) through a resistor 66 and a diode 67 serially for receiving a power increase pulse from the detector 35 via the detector 36, and also connected to the output terminal of knock detector 31 (see FIG. 1) through a resistor 68 and a diode 69 serially for receiving a knock indicating pulse from the detector 31. A series combination of a resistor 70 and a diode 71 is connected across the series combination of resistor 68 and diode 69. In this way, the negative input terminal of operational amplifier 65 receives a knock-indicating pulse from the knock detector 31 and a power increase pulse from the power increase detector 35 (see FIG. 1) via the engine coolant temperature detector 36. The cathodes of diodes 67 and 69 are connected to the amplifier 65 side, the anodes thereof being connected to the detector 31 or 36 side. The cathode of diode 71 is connected to the detector 31 side and the anode thereof is connected to the amplifier 65 side. The output terminal of operational amplifier 65 is connected to the negative input terminal thereof through a capacitor 72. A preset voltage $V_2$ is applied to the positive input terminal of operational amplifier 65. The output terminal of operational amplifier 65 constitutes the output terminal of this operating circuit 32.

The operating circuit 32 essentially constitutes a charging-discharging circuit for the capacitor 72. When the operational amplifier 65 receives a knock-indicating pulse B (see FIG. 2) from the knock detector 31, the output voltage of amplifier 65 drops at a relatively-large predetermined rate determined by the resistor 68 and the capacitor 72, as shown in the waveform C of FIG. 2. As long as the operational amplifier 65 receives no knock pulse B, the output voltage thereof rises at a relatively-small predetermined rate determined by the resistor 70 and the capacitor 72, as shown in the waveform C of FIG. 2. When the operational amplifier 65 receives a power increase pulse from the power increase detector 35 via the coolant temperature detector 36, the output voltage of amplifier 65 drops at a relatively-large predetermined rate determined by the resistor 66 and the capacitor 72, as shown by the broken-line part of the waveform C in FIG. 2.

SPARK TIMING CONTROL DEVICE AND IGNITION DEVICE

Figure 8:
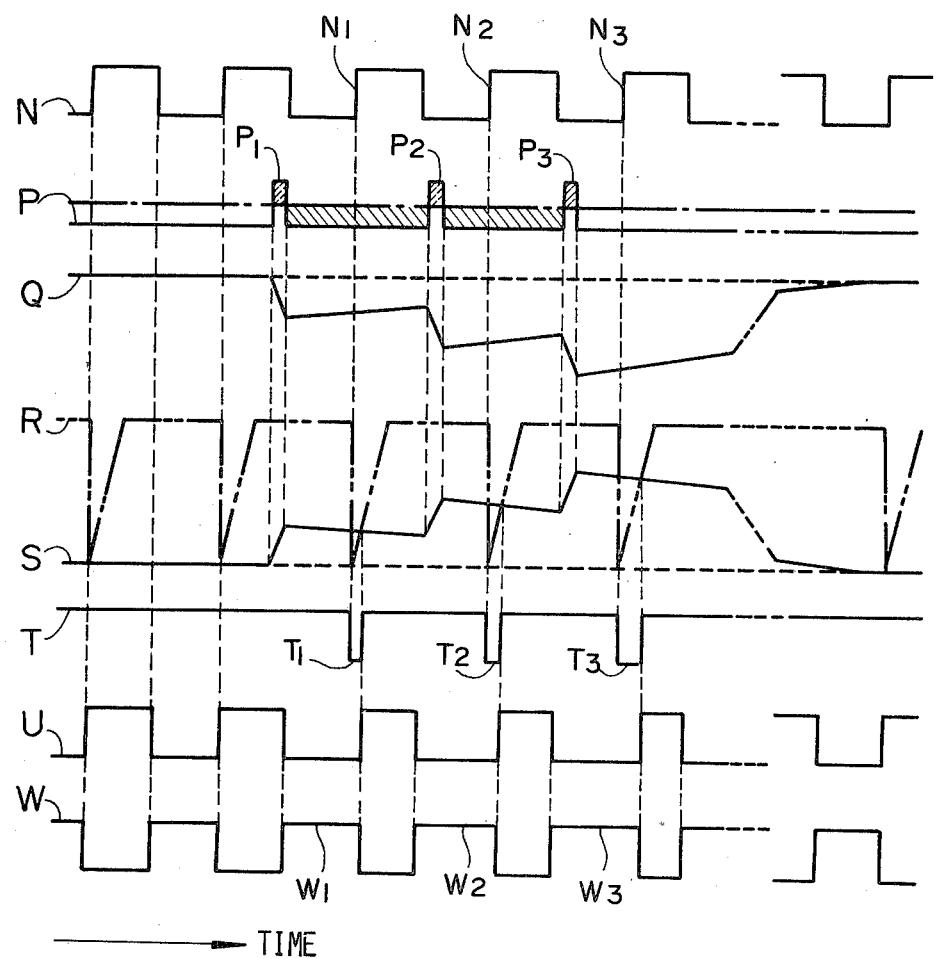
FIG. 8 is a timing chart showing waveforms obtained at various points in the schematic diagram of FIG. 7.

The details of the spark timing control device 33 are illustrated in FIG. 7, wherein the generator 52 employed also in the knock detector 31 (see FIG. 5) produces a spark timing control reference signal as shown by the waveform N of FIG. 8. The output terminal of generator 52 is connected to the input terminal of frequency-to-voltage convertor (F/V convertor) 80 in order to supply the spark timing control reference signal N to the F/V convertor 80. Since the spark timing control reference signal N takes the form of a pulse train with frequency proportional to the engine speed (RPM), the F/V convertor 80 transforms the reference signal N into a voltage signal which has a level proportional to the engine speed (RPM) or the rotational speed of the engine crankshaft. The output terminal of F/V convertor 80 is connected to the control terminal of voltage-to-current convertor (V/C convertor) 81 for applying the voltage signal thereof to the control terminal. The V/C convertor 81, virtually, includes a resistor, the voltage across which is dependent proportionally on the voltage applied to the control terminal thereof, and has first and second terminals leading to the opposite ends of the resistor respectively. The first terminal of V/C convertor 81 is connected in turn to the positive terminal of the power source (not shown), and the second terminal thereof is connected to the positive input terminal of operational amplifier 82. One terminal of capacitor 83 is connected to the positive input terminal of amplifier 82, and the other terminal thereof is grounded. The capacitor 83 is charged by the power source (not shown) via the resistor of the V/C convertor 81. Since the voltage across the resistor of the V/C convertor 81 or the current therethrough is proportional to the voltage applied to the control terminal thereof, the V/C convertor 81 will control the charging rate of the capacitor 83, that is, the rise rate of the voltage thereacross, in proportion to the rotational speed of the engine crankshaft.

The output terminal of generator 52 is also connected to the base of a first NPN transistor 84 through a resistor 85 for feeding the spark timing control reference signal N to the first transistor 84, the emitter of which is grounded. The collector of first transistor 84 is connected to the positive terminal of the power source (not shown) through a resistor 86. The collector of first transistor 84 is connected through a capacitor 88 to the base of a second NPN transistor 87, the emitter of which is grounded. The anode of a diode 89 is connected to the base of second transistor 87, and the cathode thereof is connected to ground. The base of second transistor 87 is also connected to the positive terminal of the power source (not shown) through a resistor 90. The collector of second transistor 87 is connected to the base of a third NPN transistor 91, the emitter of which is grounded. The collector of second transistor 87 is also connected to the positive terminal of the power source (not shown) through a resistor 92. The collector of third transistor 91 is connected to the positive input terminal of operational amplifier 82.

The circuit including the first, second, and third transistors 84, 87, and 91 constitutes, essentially, a switch circuit connected across the capacitor 83 for selectively discharging, that is, short-circuiting the capacitor 83. In fact, the first and second transistors 84 and 87, the resistors 85, 86, 90, and 92, the capacitor 88, and the diode 89 constitute a differentiator which differentiates the received spark timing control reference signal N to provide an extremely short pulse synchronous with the positive-going edge of spark timing control reference pulse N. This short pulse is applied to the base of third transistor 91. Upon receipt of the short pulse, the third transistor 91 is turned on to discharge the capacitor 83. After the short pulse, the third transistor 91 is turned off again so that the capacitor 83 will be charged by the power source (not shown) through the V/C convertor 81 until fully charged. As a result of these operations, the voltage of the positive input terminal of operational amplifier 82 drops from a preset high level to a preset low level instantaneously at the time of each positive-going edge of the spark timing control reference pulse N, and rises gradually from the preset low level at a fixed rate starting just after each positive-going edge of the spark timing control reference pulse N, as shown by the waveform R of FIG. 8. The rise rate of the voltage R is so arranged that the voltage R will return to the preset high level near the midpoint of the associated reference pulse N. Thus the voltage of the positive input terminal of operational amplifier 82 has a truncated-sawtooth line as shown by the waveform R of FIG. 8. Since the rise rate of the truncated-sawtooth voltage R is proportional to the rotational speed of the engine crankshaft, the angle subtended by the instantaneous drop line and the gradual rise line in the waveform R of FIG. 8 is held substantially constant with respect to the crank angle. As a result, the waveform R is unchanged in shape with respect to the crank angle regardless of the engine speed (RPM).

The negative input terminal of operational amplifier 82 is connected to the output terminal of analog invertor 300 for receiving the output thereof, an example of which is shown by the solid line S of FIG. 8. The input terminal of analog invertor 300 is connected to the output terminal of operating circuit 32 (see FIGS. 1 and 6) for receiving the output thereof, an example of which is shown by the solid line Q of FIG. 8. As shown by the waveform S of FIG. 8, the analog invertor 300 produces an inverse of the voltage signal Q from the operating circuit 32 in such a manner that the minimum voltage of the inverses will be equal to the preset low level of the truncated sawtooth-shape signal R applied to the positive input terminal of operational amplifier 82. The output terminal of operational amplifier 82 is connected to a first input terminal of an AND gate 95 for supplying the output thereof to the gate 95, and is also connected to the positive terminal of the power source (not shown) via a resistor 94. A second input terminal of AND gate 95 is connected to the output terminal of the generator 52 in order to receive the spark timing control reference pulse N. The output terminal of AND gate 95 is connected to the input terminal of invertor 96 for feeding the output thereof to the invertor 96. The output terminal of invertor 96 constitutes the output terminal of this spark timing control device 33.

The analog invertor 300 contains an operational amplifier 301, the negative input terminal of which is connected through a resistor 302 to the output terminal of operating circuit 32 (see FIGS. 1 and 6) in order to receive the voltage signal Q therefrom. The negative input terminal of operational amplifier 301 is also connected to the output terminal thereof through a resistor 303 and is grounded through resistors 304 and 305. The junction of the resistors 304 and 305 is connected to the positive terminal of the power source (not shown) through a resistor 306. The positive input terminal of operational amplifier 301 is connected to the positive terminal of the power source (not shown) through a resistor 307 and is grounded through a resistor 308 so as to be supplied with a preset constant voltage. The output terminal of operational amplifier 301 is grounded through a resistor 309, and is connected to the negative input terminal of operational amplifier 82 for sending the output thereof to the amplifier 82.

The operational amplifier 82 acts as a comparator which compares the truncated-sawtooth voltage R input from the capacitor 83 with the voltage signal S from the analog invertor 300, the inverse of the voltage signal Q outputted by the operating circuit 32. For example, when the knock detector 31 provides three knock pulses $P_1$, $P_2$, and $P_3$ to the operating circuit 32 as shown by the waveform P of FIG. 8, the voltage output of operating circuit 32 virtually drops and its inverse rises as shown by the waveforms Q and S respectively of FIG. 8. The rise in the inverse S of the operating circuit 32 output Q due to the knock pulses P causes the level of the inverse S to exceed the voltage R across the capacitor 83, because the minimum level of the inverse S is set equal to the preset low level of the voltage R. The operational amplifier 82 provides low-level output whenever the inverse S of the operating circuit 32 output Q exceeds the truncated-sawtooth voltage R, and thus produces inverse pulses $T_1$, $T_2$, and $T_3$ of variable pulse with, as shown in the waveform T of FIG. 8, in response to the knock pulses $P_1$, $P_2$, and $P_3$. The negative-going edge of each inverse pulse $T_1$, $T_2$, or $T_3$ is at the same time as the positive-going edge of the corresponding spark timing control reference pulse N, because the voltage across the capacitor 83 drops essentially instantaneously at the time of the positive-going edge of the reference pulse N. Since the angle subtended by the instantaneous drop line and the gradual rise line in the sawtooth waveform R is held constant with respect to the engine crank angle regardless of the engine speed (RPM), the width of inverse pulse T is substantially proportional to the level of the voltage signal S with a constant factor of proportionality regardless of the engine speed (RPM). Since the AND gate 95 passes the spark timing control reference pulse N only when the output T of the operational amplifier 82 goes high, the AND gate 95 outputs a width-modulated pulse train as shown by the waveform U of FIG. 8. The invertor 96 then outputs an inverted form of the width-modulated pulse train U as an spark timing control signal, as shown by the waveform W of FIG. 8. Thus the inverse pulses $T_1$, $T_2$, and $T_3$ prolong the associated spark timing control pulses $W_1$, $W_2$, and $W_3$ respectively, as shown in FIG. 8. The widths of the control pulses $W_1$, $W_2$, and $W_3$ are increased by the respective periods corresponding to the widths of the inverse pulses $T_1$, $T_2$, and $T_3$. While the positive-going edge of each spark timing control pulse W remains at the same time as the negative-going edge of the corresponding spark timing control reference pulse N, the negative-going edges of the pulses $W_1$, $W_2$, and $W_3$ are retarded from the respective positive-going edges $N_1$, $N_2$, and $N_3$ of the corresponding reference pulses respectively by periods corresponding to the widths of the inverse pulses $T_1$, $T_2$, and $T_3$ respectively. Since the width of the inverse pulse T and thus the height of the inverse S of the voltage Q increases with the frequency of the knock pulses P, the retardation of the negative-going edge of each spark timing control pulse W with respect to the spark timing control reference pulse N increases with increases in the frequency of the knock pulses P, that is, knock occurrence in the engine. The negative-going edge of each spark timing control pulse W determines spark timing as will be described hereinafter, and consequently the higher the frequency of knock occurrence, the more the spark timing is retarded in terms of crank angle. Since the width of pulse T is proportional to the level of the voltage signal S regardless of the engine speed (RPM), the amount of retardation of the spark timing is substantially also proportional to the level of signal S with a fixed factor of proportionality regardless of the engine speed (RPM).

Figure 9:
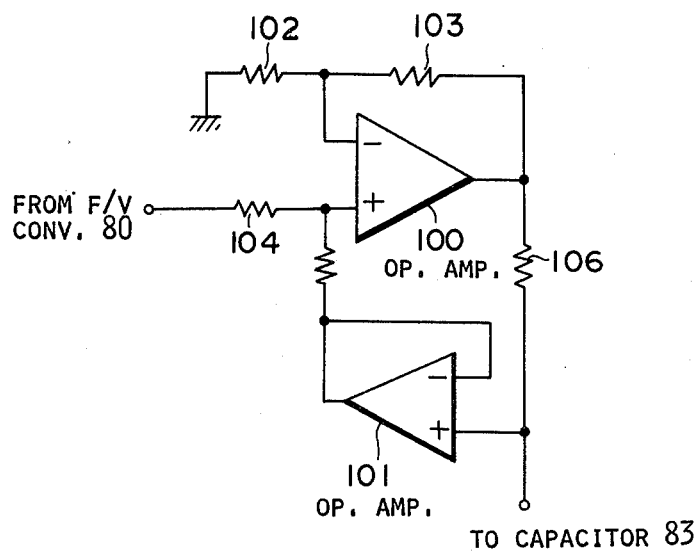
FIG. 9 is a schematic diagram of the voltage to current convertor of FIG. 7.

The details of the V/C convertor 81 are illustrated in FIG. 9, which convertor 81 includes first and second operational amplifiers 100 and 101 respectively. Power supply connections from the power source (not shown) to the amplifiers 100 and 101 are omitted in FIG. 9 for simplicity of illustration. The negative input terminal of first operational amplifier 100 is grounded through a resistor 102 and is connected to the output terminal thereof through a resistor 103. The positive input terminal of first operational amplifier 100 is connected to the output terminal of F/V convertor 80 (see FIG. 7) through a resistor 104 in order to receive the voltage signal dependent on the rotational speed of the engine crankshaft. The output terminal of second operational amplifier 101 is connected to the positive input terminal of operational amplifier 100 through a resistor 105, and is also connected to the negative input terminal thereof. The positive input terminal of second operational amplifier 101 is connected to the output terminal of first operational amplifier 100 through a resistor 106, and is also connected to the capacitor 83 and the positive input terminal of operational amplifier 82 (see FIG. 7). All the resistors 102, 103, 104, 105, and 106 are of equal resistance value.

In the operation of the V/C convertor 81, the voltage $V_{in+}$ applied to the positive input terminal of first amplifier 100 is made equal to $(V_{FV}+V_O)/2$ by the feed-back circuit composed of the second amplifier 101 and the resistor 105, while the voltage $V_{in-}$ applied to the negative input terminal of first amplifier 100 is equal to $V_{100}/2$, where $V_{FV}$ is the output voltage of the F/V convertor 80; $V_O$ is the output voltage of this V/C convertor 81, namely the voltage applied to the positive input terminal of second amplifier 101; and $V_{100}$ is the output voltage of first amplifier 100. The output voltage of first amplifier 100, namely $V_{100}$, is made equal to $V_{FV}+V_O$ by the foregoing feed-back circuit, so that the voltage across the resistor 106 is equal to $V_{FV}$. Therefore, the current across the resistor 106 and thus the current through the capacitor 83 is made equal to $V_{FV}/R_{106}$, where $R_{106}$ is the value of the resistor 106. Since the output voltage of the F/V convertor 80, namely $V_{FV}$, is proportional to the rotational speed of the engine crankshaft, the current through the capacitor 83, or the rise rate of the truncated sawtooth signal R (see FIG. 8) is also proportional to the rotational speed of the engine crankshaft. Thus, the waveform of the truncated sawtooth signal R is unchanged with respect to crank angle regardless of the rotational speed of the engine crankshaft.

Figure 10:
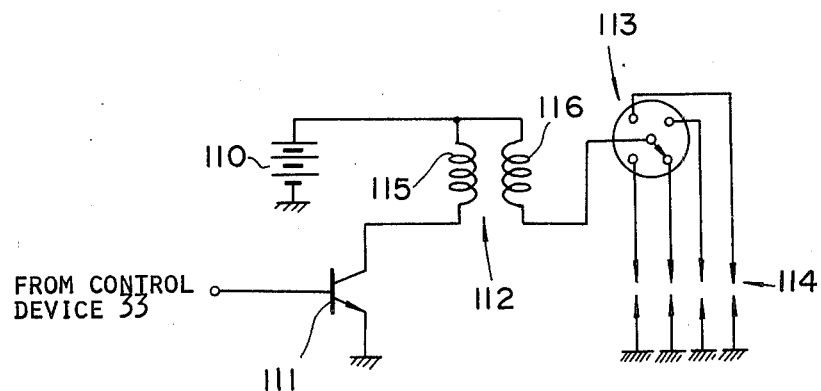
FIG. 10 is a schematic diagram of the ignition device of FIG. 1.

The details of the ignition device 34 are illustrated in FIG. 10, which device 34 has a DC power source 110, a switching NPN transistor 111, a standard ignition coil 112, a distributor 113, and a plurality of spark plugs 114 disposed in respective engine combustion chambers (not shown). The ignition coil 112 has primary and secondary windings 115 and 116 respectively. The base of transistor 111 is connected to the output terminal of the spark timing control device 33 (see FIG. 7) in order to receive the spark timing control signal as shown, for example, by the waveform W of FIG. 8. The positive terminal of power source 110 is connected to the collector of transistor 111 through the primary winding 115 of the ignition coil 112, and is also connected to the rotatable contact of distributor 113 through the secondary winding 116 of the ignition coil 112. The stationary contacts of distributor 113 are grounded through the respective spark plugs 114. Both the negative terminal of power source 110 and the emitter of transistor 111 are grounded. The distributor 113 is driven by the engine camshaft and its rotatable contact selectively connects with its stationary contacts in rotation according to the rotation of the engine camshaft.

In response to a low-level signal at its base, the transistor 111 is off to interrupt the current through the primary winding 115 from the power source 110. In response to a high level signal, the transistor 111 is on to allow current to pass through the primary winding 115. When the voltage at its base goes low again, the transistor 111 instantaneously switches to cut-off the current through the primary winding 115 so as to create a high voltage across the secondary winding 116, thereby causing a spark across the plug 114 presently connected to the secondary winding 116 via the distributor 113. As a result of these operations, a spark occurs across the designated plug 114 just when the spark timing control signal W goes from high to low, or at the negative-going edge of the spark timing control pulse W.

POWER INCREASE DETECTOR AND COOLANT TEMPERATURE DETECTOR

Figure 11:
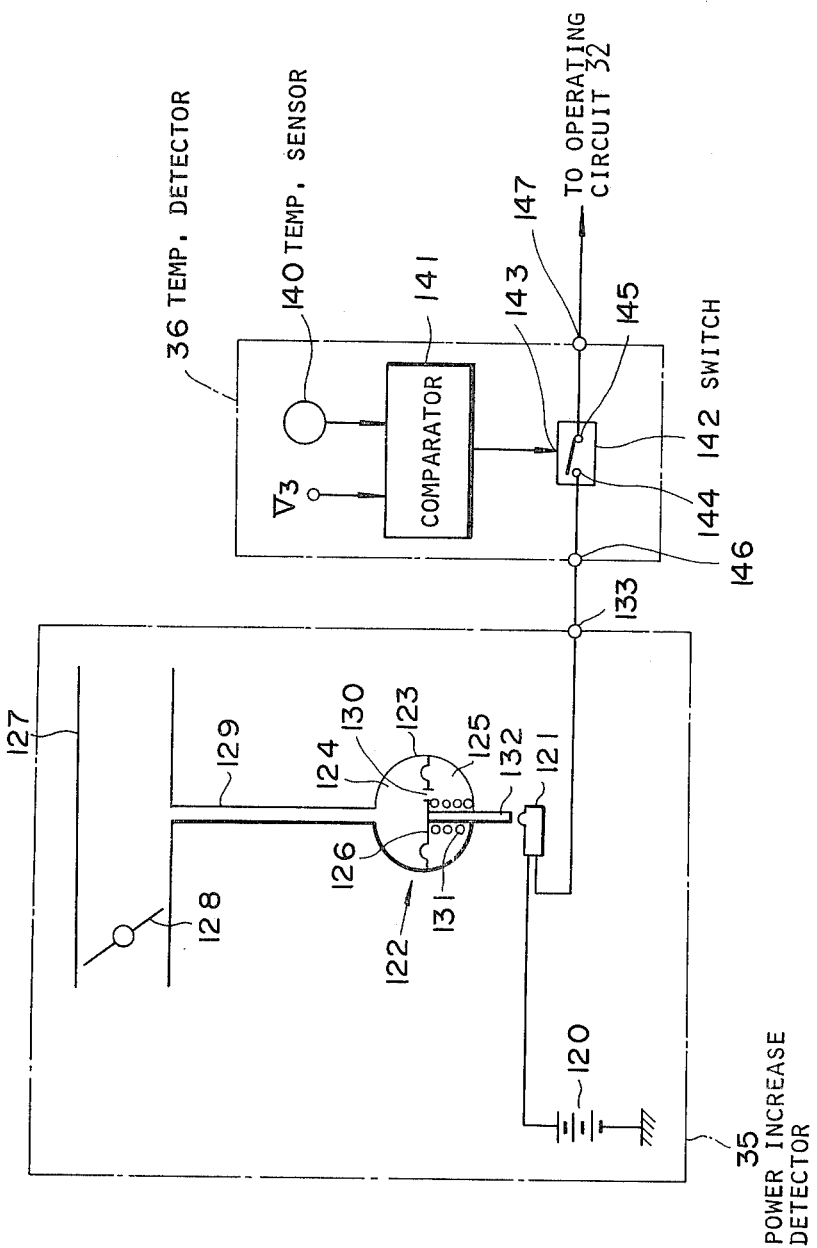
FIG. 11 is a schematic diagram and partial-section view of the power increase detector and the engine coolant temperature detector of FIG. 1.

The details of the power increase detector 35 are illustrated in FIG. 11, which detector 35 includes a DC power source 120, a switch 121, and an actuator 122 for operating the switch 120. The actuator 122 has a spherical casing 123, the inside of which is separated into first and second chambers 124 and 125 by a diaphragm 126 attached about its periphery to the casing 123. The first chamber 124 communicates with an engine intake passage or conduit 127 downstream of a throttle valve 128 in the conduit 127 through a passage or pipe 129 having a relatively large cross-section, in order to apply an intake vacuum or intake manifold vacuum to the surface of the diaphragm 126 facing the first chamber 124. The first chamber 124 also communicates with the second chamber 125 through a hole of relatively small cross-section or an orifice 130 provided in the diaphragm 126. A spring 131 is disposed in the second chamber 125 so as to exert a return force on the diaphragm 126 when the diaphragm 126 is displaced from its normal position. The diaphragm 126 moves in response to the pressure difference between the first and second chambers 124 and 125. A rod 132 is fixed at one end to the diaphragm 126 so as to be moved therewith and extends through the second chamber 125 toward the switch 121. The other end of the rod 132 is located near the switch 121 in the normal position of the rod 132 or the diaphragm 126 so that the rod 132 can actuate the switch 121 when the rod 132 is displaced toward the switch 121. The positive terminal of power source 120 is connected to an output terminal 133 of this detector 35 through a pair of contacts of switch 121, the negative terminal thereof being grounded. The switch 121 is so arranged as to connect its contacts to close the circuit when the rod 132 depresses and actuates the switch 121.

When the throttle valve 128 is moved in the valve opening direction to increase the output power of the engine in order to, for example, accelerate the engine, the intake manifold vacuum is reduced at a rate mainly depending on the opening speed of the throttle valve 128. The pressure in the first chamber 124 rises simultaneously with the reduction of the intake manifold vacuum since the large cross-section pipe 129 connects the first chamber 124 to the intake conduit 127. On the other hand, the pressure in the second chamber 125 rises more slowly than the rise rate of the pressure in the first chamber 124 because the small cross-section orifice 130 restricts the transfer of air from the first chamber 124 to the second chamber 125. Thus a pressure difference is developed between the first and second chambers 124 and 125, so that the diaphragm 126 is displaced toward the second chamber 125, thereby shifting the rod 132 toward the switch 121 during the engine power increase operation. After the pressure in the first chamber 124 stops rising, the pressure in the second chamber 125 equalizes to that in the first chamber 124, thereby allowing the diaphragm 126 to return. Since the rate and degree of reduction of intake manifold vacuum depends predominantly on the rate and degree of the engine power increase requirement, the amount and period of displacement of the rod 132 in turn depends also the rate and degree of the engine power increase requirement. Therefore, under an engine power increase operation whose rate and degree exceeds preset values, the rod 132 is moved enough to depress and actuate the switch 121 to close the same for a period depending predominantly on the rate and degree of the power increase. These preset values are determined by the force of the spring 131 and the distance between the rod 132 and the switch 121 in the normal position of the rod 132. The closing of the switch 121 causes the output terminal 133 to be high, so that when an increase in the output power is required of the engine, this detector 35 produces at its output terminal 133 a power increase pulse whose width depends on the rate and degree of the power increase.

The details of the engine coolant temperature detector 36 are also illustrated in FIG. 11, which detector 36 includes an engine coolant temperature sensor 140, a comparator 141, and a switch 142. The sensor 140 detects temperature of engine coolant and produces a voltage signal which depends on the temperature of engine coolant. One input terminal of comparator 141 is coupled to the output terminal of sensor 140 in order to receive the voltage signal indicative of engine coolant temperature. The other input terminal of comparator 141 is supplied with a predetermined reference voltage $V_3$. The comparator 141 compares the voltage signal from the sensor 140 with the reference voltage $V_3$ so that the comparator 141 will provide a high level at its output terminal when the temperature of engine coolant exceeds a preset value defined by the reference voltage $V_3$ and provide a low level when the coolant temperature is equal to or below the preset value. The switch 142 has a control terminal 143 and a pair of contacts 144 and 145. The switch 142 establishes the connection between the contacts 144 and 145 when receiving a high level at its control terminal 143. The switch 142 breaks the connection of the contacts when receiving a low level at the terminal 143. The switch 142 preferably consists of an analog switch or a relay. The control terminal 143 of the switch 142 is coupled to the output terminal of the comparator 141 for receiving the output signal thereof. The contacts 144 and 145 of the switch 142 are connected to the input and output terminals 146 and 147 of this detector 36 respectively. The input terminal 146 is coupled to the output terminal 133 of the power increase detector 35, and the output terminal 147 is connected to the operating circuit 32 (see FIGS. 1 and 6).

When the engine coolant temperature exceeds the preset value, the comparator 141 provides the switch 142 with a high level signal, thereby establishing the connection between the contacts 144 and 145 of the switch 142. As a result, the switch 142 allows a power increase pulse from the detector 35 to pass therethrough and enter the operating circuit 32 (see FIGS. 1 and 6). When the engine coolant temperature is equal to or below the preset value, the comparator 141 provides the switch 142 with a low level signal, thereby breaking the connection between the contacts 144 and 145. As a result, the switch 142 interrupts the supply of power increase pulses from the detector 35 to the operating circuit 32 (see FIGS. 1 and 6). The switch 142 of the temperature detector 36 may be disposed in the connection of the power source 120 to the output terminal 133 in series with the switch 121 of the power increase detector 35.

Figure 12:
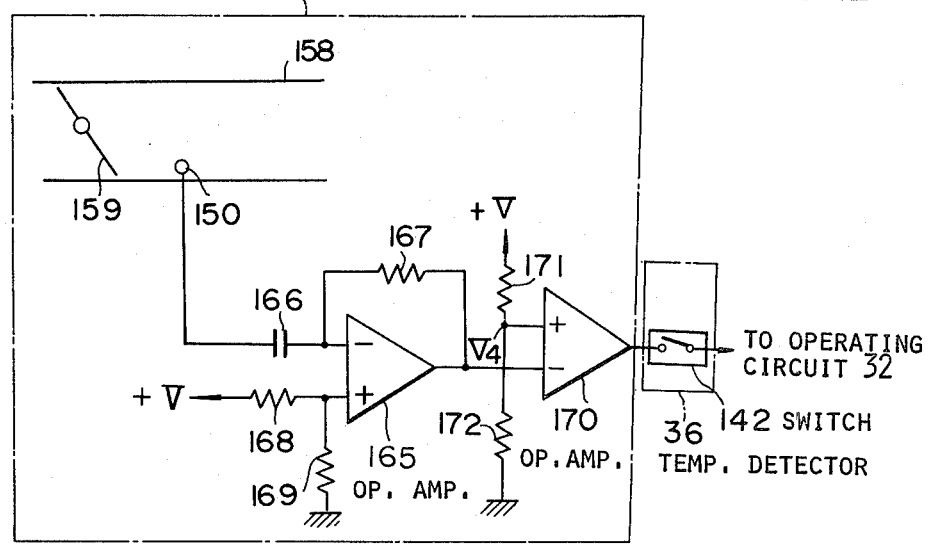
FIG. 12 is a schematic diagram and partial-section view of a power increase detector according to a first alternative embodiment of the present invention.

A first alternative embodiment of the power increase detector is illustrated in FIG. 12, which includes a pressure sensor 150 located in an air intake conduit 158 downstream of a throttle valve 159 for detecting the engine intake manifold vacuum. The sensor 150 produces a voltage signal whose level is inversely proportional to the intake manifold vacuum. The output terminal of sensor 150 is connected to the negative input terminal of an first operational amplifier 165 through a capacitor 166 for sending the output signal thereof. The negative input terminal of the first amplifier 165 is connected to the output terminal thereof through a resistor 167. The positive terminal of the first amplifier 165 is connected to the positive terminal of the power source (not shown) through a resistor 168 and is grounded through a resistor 169, thus receiving a preset voltage. The first amplifier 165, the capacitor 166, and the resistors 167, 168, and 169, constitute a differentiator for differentiating the output signal of the sensor 150. The output terminal of the first amplifier 165 is connected to the negative input terminal of a second operational amplifier 170 for sending the differentiated signal. The positive input terminal of the second amplifier 170 is connected to the positive terminal of the power source (not shown) through a resistor 171, and is grounded through a resistor 172, in order to be supplied with a preset reference voltage $V_4$ determined by the ratio of the resistor 172 to the sum of the resistors 171 and 172. The second amplifier 170 acts as a comparator to compare the output signal from the differentiator with the reference voltage $V_4$. The output terminal of second amplifier 170 goes from low to high when the output voltage of the first amplifier 165 falls across the reference voltage $V_4$. The output terminal of second amplifier 170 is connected to the operating circuit 32 (see FIGS. 1 and 6) through the switch 142 of the engine coolant temperature detector 35 (see FIG. 11).

Figure 13:
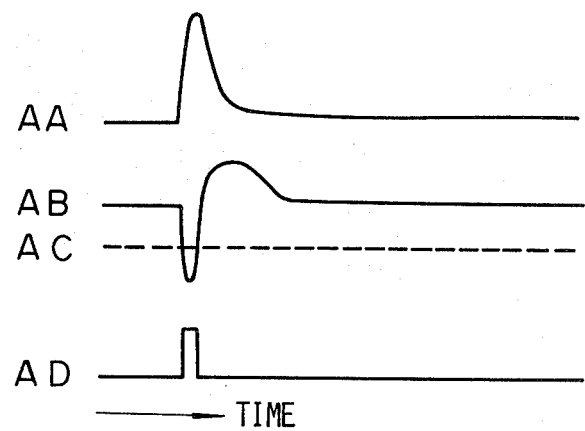
FIG. 13 is a timing chart showing waveforms obtained at various points in the diagrammatic view of FIG. 12.

When the throttle valve 159 is moved in the valve opening direction to increase the output power of the engine, the intake manifold vacuum is reduced and thus the output voltage of the sensor 150 rises abruptly as shown by the waveform AA of FIG. 13. The rise in the output voltage AA of the sensor 150 causes an abrupt reduction in the output voltage of the differentiating amplifier 165 as shown by the waveform AB of FIG. 13. When the differentiated signal AB from the first amplifier 165 falls across the reference voltage $V_4$ shown by the waveform AC of FIG. 4, the output voltage of second amplifier 170 goes from low to high as shown by the waveform AD of FIG. 13. As the opening speed of the throttle valve 159 decreases and the reduction rate of the intake manifold vacuum drops below a given value, the output voltage AB of the differentiating amplifier 165 rises above the reference voltage $V_4$, thereby returning the output voltage of second amplifier 170 to the low level. In this way, when an increase in the output power is required of the engine, this power increase detector produces a power increase pulse AD whose width usually depends on the period of the engine power increase operation.

Figure 14:
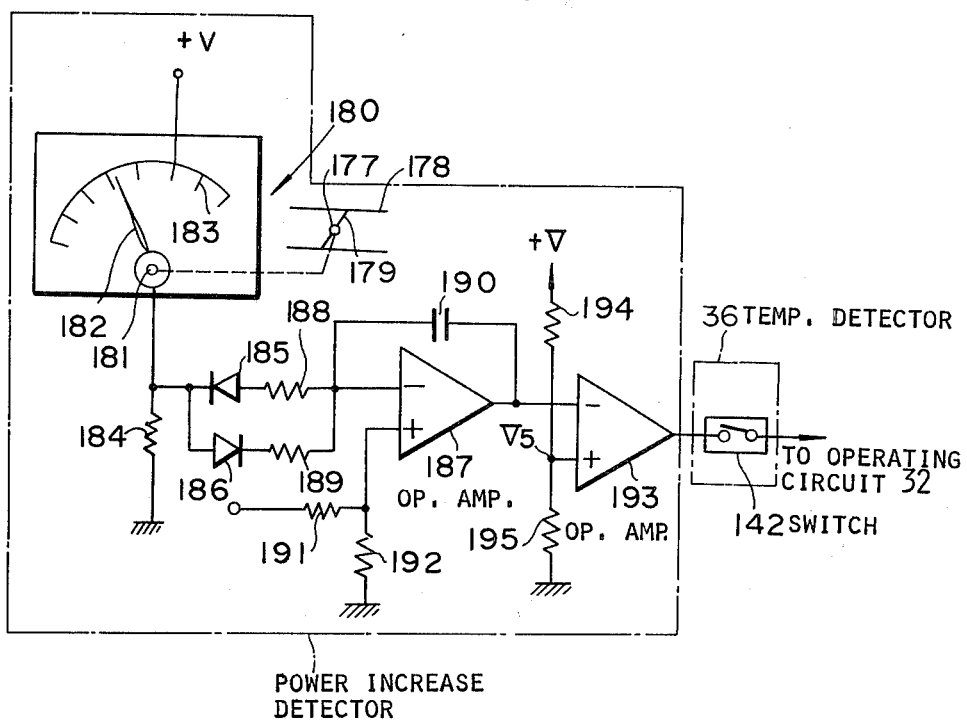
FIG. 14 is a schematic diagram of a power increase detector according to a second alternative embodiment of the present invention.

A second alternative embodiment of the power increase detector is illustrated in FIG. 14, which includes a switch 180 for detecting the opening movement of an engine throttle valve 179 disposed in an engine intake passage 178. The switch 180 has a shaft 181, a rotatable contact 182, and a set of stationary contacts 183. The shaft 181 is connected to a throttle valve driving shaft 177 to be rotated along with the same or the throttle valve 179. The rotatable contact 182 takes the form of a needle, one end of which is mounted on the shaft 181 so that the contact 182 will be turned along with the throttle valve driving shaft 177 or the throttle valve 179. The stationary contacts 183 are equally spaced along an arc concentric to the shaft 181 so that the free end of the rotatable contact 182 can electrically connect with any of the stationary contacts 183 in order only when the rotatable contact 182 or the throttle valve 179 is rotated in the direction of opening the throttle valve 179. The stationary contacts 183 are commonly connected to the positive terminal of the power source (not shown), and the rotatable contact 182 is grounded through a resistor 184.

The junction of the contact 182 and the resistor 184 is connected to the cathode of a first diode 185 and the anode of a second diode 186. The anode of the first diode 185 is connected to the negative input terminal of a first operational amplifier 187 through a resistor 188. The cathode of the second diode 186 is connected also to the negative input terminal of the amplifier 187 through a resistor 189. The output terminal of amplifier 187 is also connected to the negative input terminal thereof through a capacitor 190. The positive input terminal of amplifier 187 is connected to the positive terminal of the power source (not shown) through a resistor 191 and is grounded through a resistor 192, thus receiving a preset voltage. The first operational amplifier 187, the diodes 185 and 186, the resistors 188, 189, 191, and 192, and the capacitor 190 constitute a charging-discharging circuit for the capacitor 190.

The output terminal of the amplifier 187 is connected to the negative input terminal of a second operational amplifier 193 for sending the output signal therefrom. The positive input terminal of second amplifier 193 is connected to the positive terminal of the power source (not shown) through a resistor 194 and is grounded through a resistor 195, in order to be supplied with a preset reference voltage $V_5$ defined by the ratio of the resistor 195 to the sum of the resistors 194 and 195. The second amplifier 193 acts as a comparator to compare the output voltage of the first amplifier 187 with the reference voltage $V_5$. The output voltage of the second amplifier 193 goes from low to high when the output voltage of the first amplifier 187 falls across the reference voltage $V_5$. The output terminal of second amplifier 193, forming an output terminal of this power increase detector, is connected to the operating circuit 32 (see FIGS. 1 and 6) through the switch 142 of the engine coolant temperature detector 35 (see FIG. 11).

Figure 15:
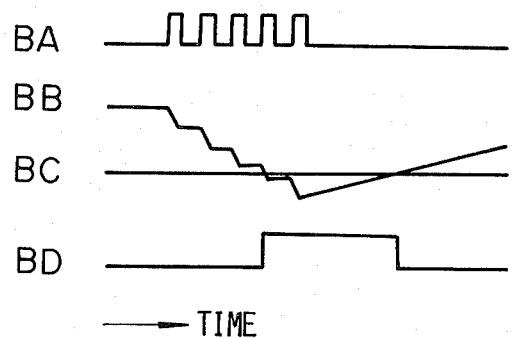
FIG. 15 is a timing chart showing waveforms obtained at various points in the schematic diagram of FIG. 14.

When the throttle valve 79 is opened to increase the output power of the engine and the rotatable contact 182 of the switch 180 connects with the stationary contacts 183 thereof in order, the junction of the rotatable contact 182 and the resistor 184 is supplied with a pulse train, as shown by the waveform BA of FIG. 15, the number of pulses of which is equal to the number of connections between the rotatable and the stationary contacts 182 and 183. When the voltage BA at the junction is high, the output voltage of first amplifier 187 falls at a first preset rate determined by the resistor 189 and the capacitor 190 until the output voltage reaches the minimum possible value thereof. When the voltage BA at the junction is low, the output voltage of first amplifier 187 rises at a second preset rate determined by the resistor 188 and the capacitor 190 until the output voltage reaches the maximum possible value thereof. The first rate of the drop in the output voltage of the first amplifier 187 is preferably set greater than the second rate of the rise in it. Therefore, when the junction of the rotatable contact 182 and the resistor 184 is supplied with a pulse train as shown by the waveform BA of FIG. 15, the output voltage of the first amplifier 187 falls substantially as shown by the waveform BB of FIG. 15. As soon as the output voltage BB of the first amplifier 187 falls across the reference voltage $V_5$ shown by the waveform BC of FIG. 15, the output voltage of the second amplifier 193 goes from low to high as shown by the waveform BD of FIG. 15. After the movement of the throttle valve 179 is stopped and the junction of the rotatable contact 182 and the resistor 184 is no longer supplied with pulses, the output voltage BB of the first amplifier 187 rises at the second rate and soon crosses the reference voltage $V_5$, thereby causing the output voltage BD of the second amplifier 193 to go low. In this way, when an increase in the output power is required of the engine, this power increase detector produces a power increase pulse whose width in turn depends on the degree of the power increase requirement.

Figure 16:
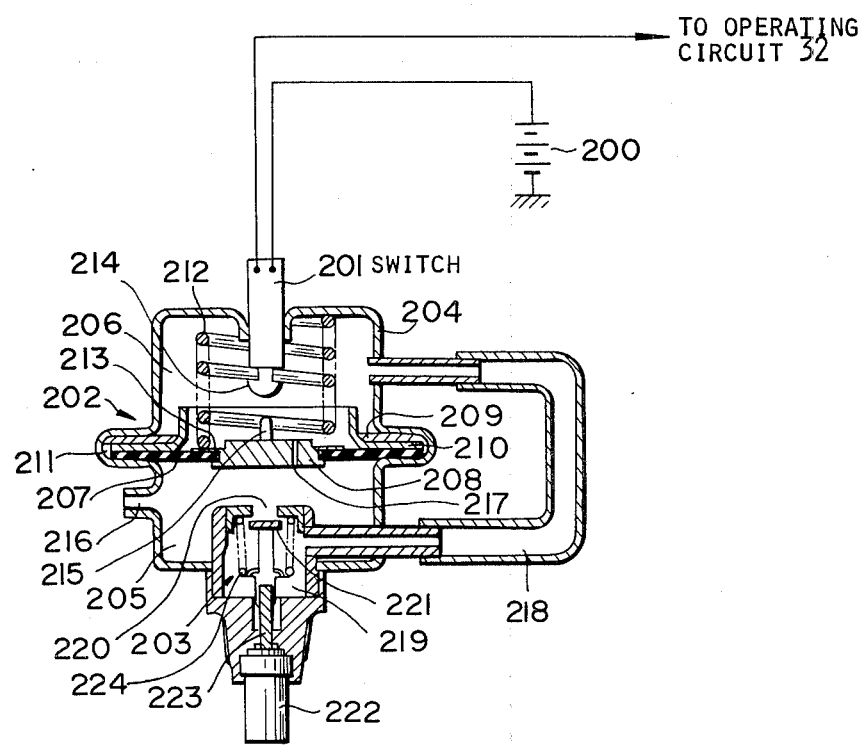
FIG. 16 is a diagrammatic sectional view of a power increase detector and an engine coolant temperature detector according to a third alternative embodiment of the present invention.

A third alternative embodiment of the power increase detector and the engine coolant temperature detector is illustrated FIG. 16, which detectors include a DC power source 200, a switch 201, an actuator 202, and a valve 203. The actuator 202 has a cylindrical casing 204, the inside of which is separated into first and second chambers 205 and 206 by a diaphragm 207 and a disk 208. The diaphragm 207 has a circular central opening into which the disk 208 is hermetically, securely fitted. The diaphragm 207 is attached about its periphery to the cylindrical casing 204 by means of first and second annular members 209 and 210. The cylindrical casing 204 has an outwardly extending peripheral recess 211 into which the first and second annular members 209 and 210, and the diaphragm 207 are accommodated in that order about their peripheries and clamped together by the casing 204 walls sandwiching them. In the second chamber 206, a spring 212 is provided between the casing 204 and an annular spring seat 213 attached to the periphery of the disk 208 and abutting the diaphragm 207, in order to exert a force on the diaphragm 207 against displacement of the diaphragm 207 from its normal position. The cylindrical casing 204 has an circular central opening into which the switch 201 is hermetically, securely fitted in such a manner that its control rod 214 is located in the second chamber 206. An actuating rod 215 is secured to the disk 208 in such a manner that the actuating rod 215 is located in the second chamber 206 so as to be able to push and operate the control rod 214 of the switch 201.

The first chamber 205 is connected to an air intake duct (not shown) downstream of an engine throttle valve (not shown) by means of a relatively large cross-section pipe 216 to be supplied with intake manifold vacuum. The first and second chambers 205 and 206 communicate with each other through a hole of relatively small cross-section or orifice 217 in the disk 208 and through a passage 218 of relatively large cross-section. The passage 218 opens to the first chamber 205 through a third chamber 219 and a hole 220 provided between the third and first chambers 219 and 205 respectively.

A valve member 221 of the valve 203 is located in the third chamber 219 for opening and closing the hole 220 or the passage 218. The valve member 221 is connected to a temperature responsive member 222 of the valve 203 by means of a connecting rod 223 so as to be driven by the temperature responsive member 222. The temperature responsive member 222 contains a wax pellet which expands with increasing temperature of engine coolant or lubricant and drives the valve member 221 via the rod 223. Concretely, the temperature responsive member 222 is preferably immersed in the engine coolant. The valve member 221 is biased by a spring 224 located in the third chamber 219. This temperature responsive valve 203 is so arranged that the valve member 221 will close the hole 220 when the engine coolant temperature is above a preset value and open the hole 220 when the temperature is equal to or below the preset value. This preset value is dominantly determined by the expansion characteristic of the wax pellet and the force of the spring 224.

The switch 201 has a pair of contacts (not shown), one being connected to the positive terminal of the power source 200 and the other being connected to the operating circuit 32 (see FIGS. 1 and 6). The contacts of the switch 201 are connected when the control rod 214 is depressed by the actuating rod 215 and are disconnected when the actuating rod 215 is disconnected from the control rod 214. The negative terminal of the power source 200 is grounded.

Under conditions in which the engine coolant temperature is above the preset value and hence the hole 220 or the passage 218 is closed by the valve 203, when an increase in the output power is required of the engine, the diaphragm 207 along with the actuating rod 215 is displaced toward the switch 201 due to the occurrence of a large pressure difference between the first and second chambers 205 and 206, and thus the switch 201 is driven by the actuating rod 215 or the actuator 202 in a manner similar to that of the actuator of FIG. 11. As a result, the operating circuit 32 is fed with a power increase pulse whose width depends on the rate and degree of the engine power increase. Under conditions in which the engine coolant temperature is equal to or below the preset value and hence the hole 220 or the passage 218 is open, even when an increase in the output power is required of the engine, the diaphragm 207 remains at rest because air is allowed to flow from the first to the second chambers 205 and 206 via the relatively large cross-section passage 218 and thus no substantial pressure difference occurs between the first and second chambers 205 and 206. In this case, the actuating rod 215 can not actuate the switch 201 and therefore no power increase pulse is generated.

Figure 17:
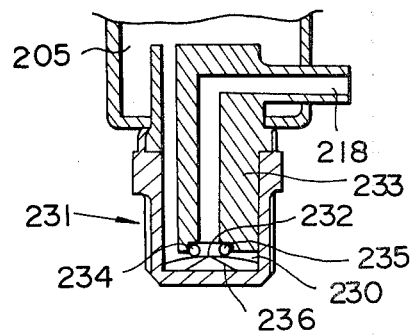
FIG. 17 is a cross-sectional view of a power increase detector and an engine coolant temperature detector according to a fourth alternative embodiment of the present invention.

A fourth alternative embodiment of the power increase detector and the engine coolant temperature detector is partially illustrated in FIG. 17, which is tailored in a manner similar to that of the third embodiment in FIG. 16 except for the following design change. A relatively large cross-section passage 218 leads to the first chamber 205 through a chamber 230 provided along passage 218 and formed in a projection 231. The other end of the passage 218 is connected to the second chamber (see FIG. 16). A valve member 232 made of a temperature responsive material, such as bimetal, is located in the chamber 230 for closing and opening the passage 218 in response to the temperature of the engine body or engine coolant. In fact, the projection 231 is preferably immersed in the engine coolant so that the bimetal 232 will be responsive to the engine coolant temperature. The passage 218 is formed in a column member 233 accommodated in the projection 231 and leads to the chamber 230 defined by the end of the column member 233 and the projection 231 wall. The passage 218 extends between the projection 231 wall and the outer surface of the column member 233, from the chamber 230 to the first chamber 205. The column member 233 has at its end an annular recess 234 at the center of its end surface. An annular sealing member 235 is provided between the bimetal 232 and the column member 233 at its recess 234 so as to form a valve seat for the bimetal 232 acting as a valve member. The bimetal 232 is biased by a spring 236 located in the chamber 230. When the engine coolant temperature is above a preset value, the bimetal 232 abuts against the sealing member 235 to close the passage 218. When the temperature is equal to or below the preset value, the bimetal 232 detaches from the sealing member 235 to open the passage 218. Thus, these power increase detector and the engine coolant temperature detector operates similarly to those of FIG. 16.

It should be understood that further modifications and variations may be made in the present invention without departing from the spirit and scope of the present invention as set forth in the appended claims.

What is claimed is:

1. A spark timing control system for an internal combustion engine having a combustion chamber and engine coolant, comprising:
   (a) first means for sensing an increase in the power output required of the engine and generating a power-increase signal indicative thereof;
   (b) second means for producing a spark in the combustion chamber at adjustable timing in terms of crank angle of the engine, the second means responsive to the power-increase signal for retarding the spark timing when the increase in the power output is required of the engine;
   (c) third means for sensing the temperature of the engine coolant and generating a temperature signal indicative thereof; and
   (d) fourth means responsive to the temperature signal for selectively enabling and disabling the retardation of the spark timing in accordance with the temperature of the engine coolant.

2. A spark timing control system as recited in claim 1, wherein the fourth means is operative to enable the retardation of the spark timing when the temperature of the engine coolant is higher than a preset value and disable the retardation of the spark timing when the temperature of the engine coolant is equal to or below the preset value.

3. A spark timing control system for an internal combustion engine having a combustion chamber and engine coolant, comprising:
   (a) first means for sensing engine knocking and generating a knock signal indicative thereof;
   (b) second means for sensing an increase in the power output required of the engine and generating a power-increase signal indicative thereof;
   (c) third means for producing a spark in the combustion chamber at adjustable timing in terms of crank angle of the engine, the third means responsive to the knock signal for retarding the spark timing when knock occurs and advancing the spark timing when no knock occurs, the third means also responsive to the power-increase signal for retarding the spark timing when the increase in the power output is required of the engine;
   (d) fourth means for sensing the temperature of the engine coolant and generating a temperature signal indicative thereof; and
   (e) fifth means responsive to the temperature signal for selectively enabling and disabling the retardation of the spark timing due to the power increase in accordance with the temperature of the engine coolant.

4. A spark timing control system as recited in claim 3, wherein the fifth means is operative to enable the retardation of the spark timing when the temperature of the engine coolant is higher than a preset value and disable the retardation of the spark timing when the temperature of the engine coolant is equal to or below the preset value.

5. A spark timing control system for an internal combustion engine having a combustion chamber, a throttle valve, and engine coolant, the system comprising:
   (a) an ignition device for producing a spark in the combustion chamber;
   (b) a power increase detector for sensing an increase in the power output required of the engine and generating an electrical pulse indicative thereof;
   (c) a control device connected to the ignition device for controlling timing of the production of the spark, the control device also connected to the power increase detector to receive the electrical pulse therefrom for retarding the spark timing in terms of crank angle of the engine when the increase in the power output is required of the engine;
   (d) a temperature switch responsive to the temperature of the engine coolant and disposed in the connection of the power increase detector to the control device for interrupting the feed of the electrical pulse from the power increase detector to the control device to suspend the retardation of the spark timing in accordance with the temperature of the engine coolant; and
   (e) said power increase detector including a throttle sensor for sensing an opening movement of the throttle valve and outputting a pulse train when the throttle valve is opened, an integrating circuit connected to the throttle sensor for integrating the pulse train therefrom and outputting a voltage signal, the level of which depends on the integrated value of the pulse train, and a comparator, connected at its first input terminal to the integrating circuit and supplied at its second input terminal with a reference voltage for comparing the voltage signal from the integrating circuit to the reference voltage, the integrating circuit operative to reduce the magnitude of the output signal thereof at a preset rate when receiving no pulse from the throttle sensor, the output terminal of the comparator connected to the control device through the temperature switch, whereby the comparator outputs a pulse when the throttle valve is moved in the valve opening direction to increase the engine power output.

6. A spark timing control system as recited in claim 5, wherein the throttle sensor includes a DC power source and a throttle switch having a movable contact and a set of stationary contacts, the DC power source connected to the integrating circuit through the throttle switch for supplying the integrating circuit with said pulse train when the throttle switch is actuated, the movable contact moving integrally with the throttle valve for contacting the stationary contacts in order to output said pulse train when the throttle valve is moved in the valve opening direction.

7. A spark timing control system as recited in claim 5, further comprising a knock sensor and a knock detector, the knock sensor associated with the engine for sensing knock in the engine and generating a primary knock signal indicative thereof, the knock detector connected to the knock sensor for receiving the primary knock signal, the knock detector operative to discriminate the occurrence of knock on the basis of the primary knock signal and generate a secondary knock signal indicative thereof, the knock detector connected to the control device for sending the secondary knock signal thereto, the control device responsive to the secondary knock signal for retarding the spark timing in terms of crank angle of the engine when knock occurs and advancing the spark timing in terms of crank angle of the engine when no knock occurs.

8. A spark timing control system as recited in claim 7, wherein the throttle sensor includes a DC power source and a throttle switch having a movable contact and a set of stationary contacts, the DC power source being connected to the integrating circuit through the throttle switch for supplying the integrating circuit with said pulse train when the throttle switch is actuated, the movable contact moving integrally with the throttle valve for contacting the stationary contacts in order to output said pulse train when the throttle valve is moved in the valve opening direction.

* * * * *